United States Patent [19]

Nelsen et al.

[11] Patent Number: 5,687,986
[45] Date of Patent: Nov. 18, 1997

[54] ATTACHMENT DEVICE FOR AN INFLATABLE PROTECTIVE CUSHION

[75] Inventors: James M. Nelsen, Albuquerque; Daniel A. Luna, Los Lunas; Kenneth W. Gwinn, Cedar Crest, all of N. Mex.

[73] Assignee: Precision Fabric Group, Greensboro, N.C.

[21] Appl. No.: 579,827

[22] Filed: Dec. 28, 1995

[51] Int. Cl.⁶ ........................................... B60R 21/16
[52] U.S. Cl. ......................... 280/728.2; 280/743.1; 280/731
[58] Field of Search ..................... 280/728.2, 731, 280/743.1

[56] References Cited

U.S. PATENT DOCUMENTS

| | | | |
|---|---|---|---|
| 5,064,218 | 11/1991 | Hartmeyer | 280/728.2 |
| 5,195,774 | 3/1993 | Morita | 280/731 |
| 5,275,431 | 1/1994 | Stephens | 280/728 |
| 5,320,379 | 6/1994 | Burnard et al. | 280/728.2 |
| 5,498,031 | 3/1996 | Kosugi | 280/743.1 |
| 5,511,818 | 4/1996 | Jarboe et al. | 280/728.2 |
| 5,542,692 | 8/1996 | Shaklik et al. | 280/728.2 |
| 5,549,326 | 8/1996 | Rodriguez Ramos | 280/743.1 |

Primary Examiner—Christopher P. Ellis
Attorney, Agent, or Firm—Finnegan, Henderson, Farabow, Garrett & Dunner

[57] ABSTRACT

An inflatable cushion assembly for use with an inflator comprises an inflatable cushion having an inner surface, outer surface, and at least one protrusion extending from one of the inner or outer surfaces. The inflatable cushion defines an opening between the inner surface and the outer surface for receiving the inflator. An attachment member contacts the one of the inner or outer surfaces adjacent the opening and includes a groove for receiving the protrusion, the attachment member securing the inflator within the opening.

28 Claims, 8 Drawing Sheets

ATTACHMENT DEVICE FOR AN INFLATABLE PROTECTIVE CUSHION

BACKGROUND OF THE INVENTION

This invention was made with the support of the United States Government under Contract No. DE-AC04-94AL85000, awarded by the Department of Energy. The United States Government has certain rights in the invention.

FIELD OF THE INVENTION

The present invention relates to attachment hardware for inflatable protective cushions, and provides an apparatus particularly useful in an airbag for protecting passengers in automotive vehicles. The present invention would also be useful in many types of transportation vehicles, as well as machinery, as a protective device that can be stored compactly.

Inflatable protective cushions used in passenger vehicles are a component of relatively complex systems. The main elements of these systems are: an impact sensing system, an inflation system, a propellant, an attachment device, a system enclosure, and an inflatable protective cushion. Upon sensing an impact, the inflation system causes the propellant to fill the cushion to a deployed state which can absorb the impact of the forward movement of a body and dissipate its energy by means of rapid venting of the gas. The deployment sequence occurs within about 30 milliseconds, with the occupant decelerating about 50 milliseconds later. The maximum pressure occurring in the cushion in the inflation event is about 4 psi and increases to about 7–9 psi when impacted by a person. In the un-deployed state, the cushion is stored in or near the steering column, the dashboard, in a door, or in the back or side of a seat, placing the cushion in close proximity to the person it is to protect.

To provide efficient storage and adequate protection, it is advantageous to have an inflatable protective cushion that has a small volume when not deployed permitting compact storage, low permeability permitting fast inflation, and strength for withstanding inflation pressure and absorbing the impact of a person or an object.

DESCRIPTION OF THE RELATED ART

U.S. Pat. No. 5,275,431 discloses an airbag inflator assembly including an inflator, an inflatable cushion, a support plate, and a retainer. In this assembly, the retainer includes a flange extending radially from the cylindrical inflator. The cushion is mounted to the inflator by securing it between the flange and the support plate using fasteners. The flange and support plate are planar over the portions which grip the cushion. Stitching that holds various pieces of the cushion together extends circularly around the inflator and is pressed between the support plate and the flange.

One problem with such assemblies is that, during inflation, the cushion might tear or shear at high stress areas around the inflation opening. The high stress areas can be caused, for example, by the cushion's geometry or by the location of holes in the cushion for receiving fasteners. Furthermore, the substantially planar attachment hardware does not distribute stresses uniformly enough throughout the gripped portion of the fabric during deployment, further contributing to the development of high stress areas. Tearing at these high stress areas during deployment can cause the cushion to provide insufficient resistance to inflation pressure as well as pressure created by the contact of a person or object to the cushion, and could lead to injury.

Another problem with the assembly of U.S. Pat. No. 5,275,431 is that part of the seams of the cushion are held between the planar flange and support plate of the attachment hardware, leading to an uneven gripping of the fabric. The seams being thicker than the rest of the cushion, are gripped much more tightly than the rest, thereby leading to stress concentrations at the seams during deployment and potential failure. As the seams include multiple folded layers of cushion material, the uneven gripping is accentuated even more.

In some cushions, seams extend across the attachment hardware from the gripped portion to the ungripped (inflatable) portion. One problem with such a cushion, evident when the cushion is inflated, is the creation of a transition in the orientation of the seam between the portion rigidly secured by the attachment hardware and the inflated part of the seam. This transition, located radially just outside of the attachment hardware, induces an undesirable stress concentration in the cushion during inflation.

SUMMARY OF THE INVENTION

The objects of the present invention are to provide a low cost inflatable protective device with a cushion and attachment hardware of simple and structurally efficient design with a shape and construction that optimizes the cushion's ability to withstand inflation pressure and impact when deployed and which distributes inflation-induced stresses in the cushion.

To achieve the objects and in accordance with the purpose of the invention, as embodied and broadly described herein, the invention includes an inflatable cushion assembly for use with an inflator, the assembly including an inflatable cushion having an inner surface, an outer surface, and at least one protrusion extending from one of the inner or outer surfaces. The inflatable cushion defines an opening between the inner surface and the outer surface for receiving the inflator. An attachment member contacts one of the inner or outer surfaces adjacent the opening and includes a groove for receiving the protrusion, the attachment member securing the inflator within the opening.

In another aspect, the invention includes an inflatable cushion assembly including a tray and an inflatable cushion secured to the tray, the cushion having an inner surface, an outer surface, and at least one protrusion extending from one of the inner or outer surfaces. The inflatable cushion defines an opening between the inner surface and the outer surface. An attachment assembly contacts the one of the inner or outer surfaces for securing the inflatable cushion to the tray, and includes means for receiving the protrusion.

Still another aspect of the invention includes an assembly for mounting an inflatable cushion to a mounting surface, the inflatable cushion having an inner surface, an outer surface, and at least one protrusion extending from one of the inner or outer surfaces, the inflatable cushion defining an opening between the inner surface and the outer surface. The assembly includes an inflator extending through the opening for inflating the inflatable cushion and an attachment member integral with and extending from the inflator, and contacting the one of the inner or outer surfaces adjacent the opening. The attachment member includes a groove for receiving the protrusion. Connection members secure the attachment member and the inflatable cushion to the mounting surface.

Another aspect of the invention includes an inflatable cushion assembly for use with an inflator, the assembly including an inflatable cushion having an inner surface and an outer surface, and defining an opening between the inner surface and the outer surface for receiving the inflator. An attachment member includes a nonplanar contact surface for contacting a portion of one of the inner or outer surfaces adjacent the opening, the attachment member for securing the inflator within the opening.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the written description and claims as well as the appended drawings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in FIGS. 1–22. Wherever possible, the same reference numbers will be used throughout the drawings to refer to the same or like parts.

Figure 1:
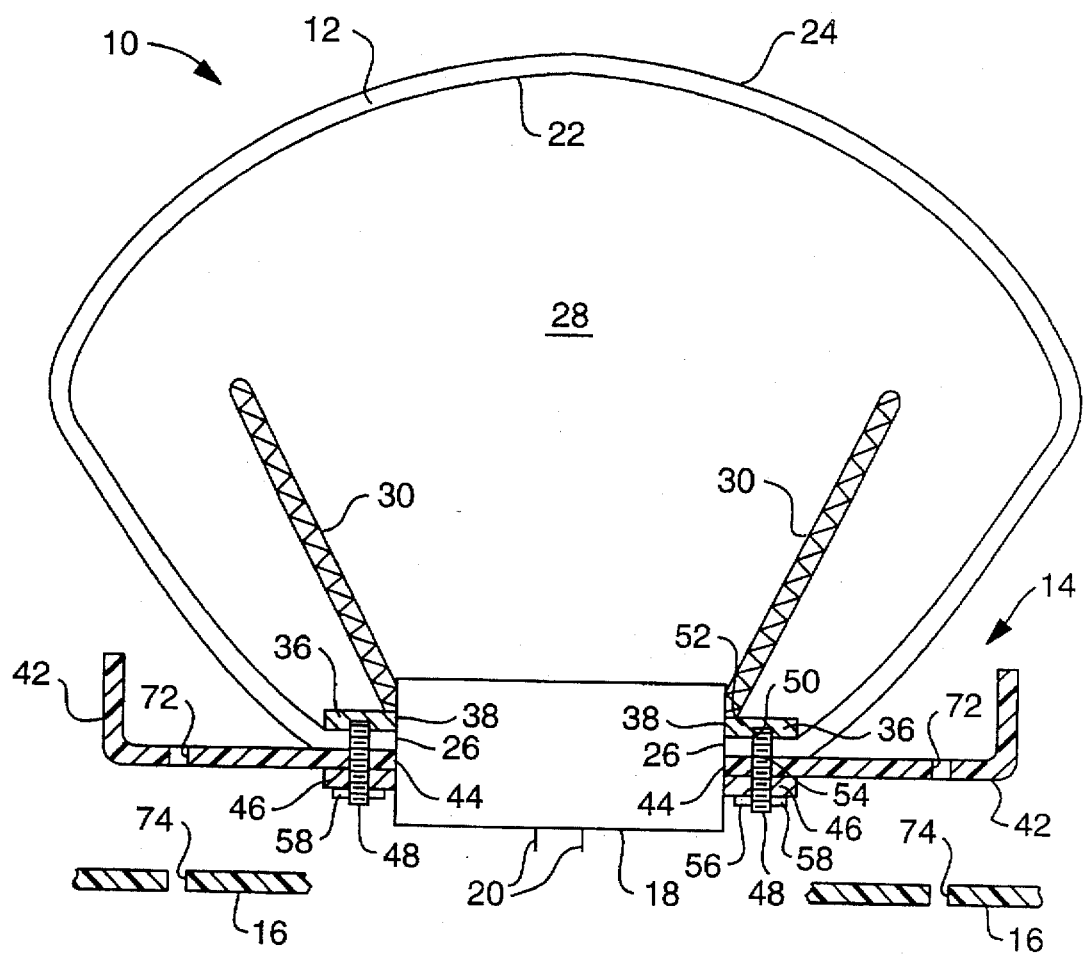
FIG. 1 is a sectional view of a preferred embodiment of the present invention showing an inflatable cushion and an attachment assembly.

As shown in FIG. 1, the preferred embodiment of the invention includes an inflatable cushion assembly 10 including an inflatable cushion 12 secured to an attachment assembly 14. The attachment assembly 14 is secured to a housing 16, and thus secures the cushion 12 to the housing. The housing 16 may be, for example, a portion of a vehicle such as a steering wheel, a dashboard, a seat, a door, or some other surface. An inflator 18 is provided for inflating the cushion 12 upon receiving an electrical signal via electrical connectors 20, as is well known in the art.

The cushion 12 includes an inner surface 22, an outer surface 24, and an opening 26 for receiving the inflator 18. The inner surface 22 defines a cavity 28, shown in FIG. 1 in an inflated condition.

Figure 2:
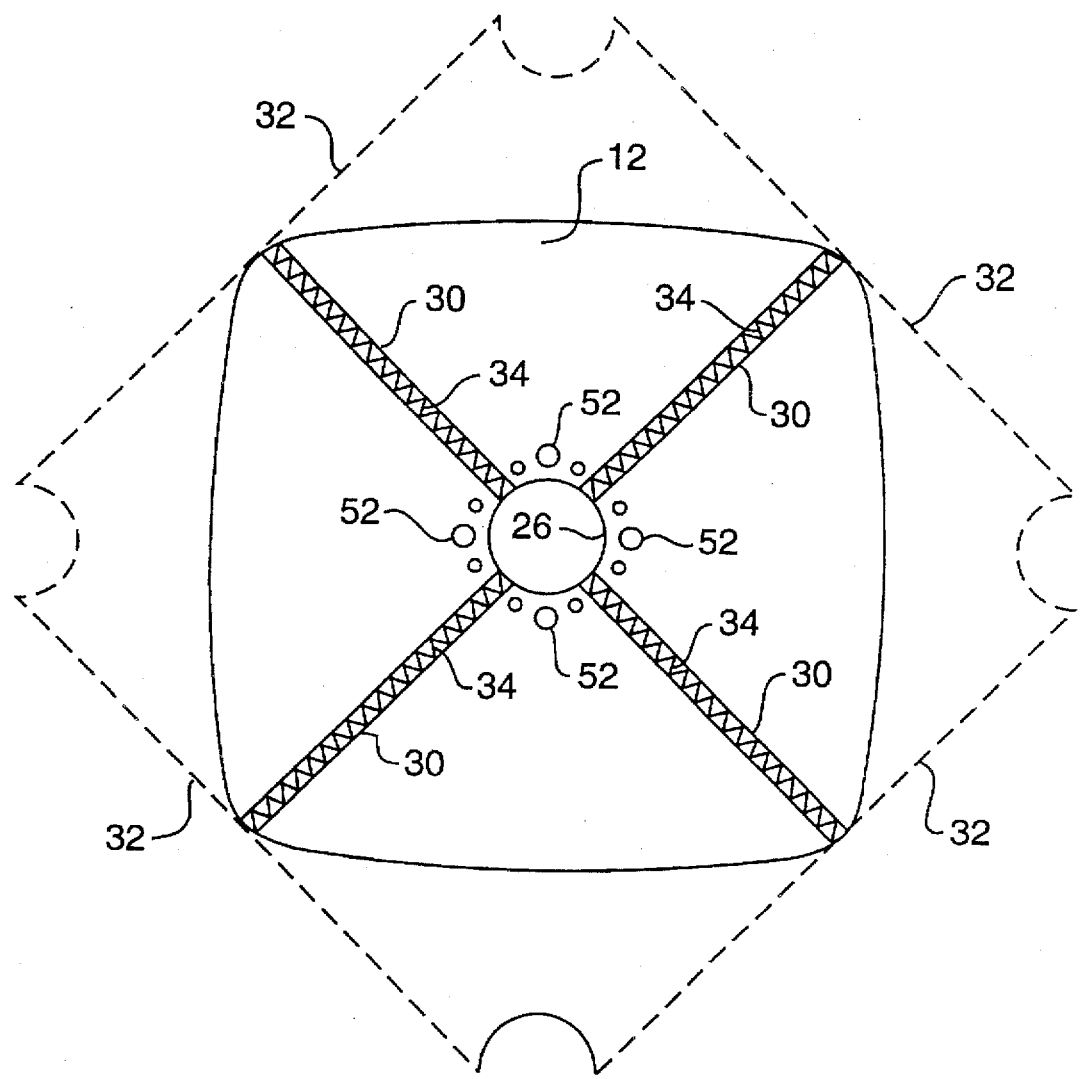
FIG. 2 is bottom view of an inflatable cushion suitable for use with the devices of FIG. 1.

When the inflatable cushion 12 is secured within the housing 16, various types of protrusions may be present on the cushion. For example, protrusions such as seams 30 sewn into the cushion material to join the material into the cushion 12 may extend from either surface of the cushion. As shown in FIG. 2, the cushion 12 preferably has seams 30 extending radially from the opening 26 that receives the inflator 18. Such an air cushion is disclosed in U.S. patent app. Ser. No. 08/872,471, filed Jun. 28, 1993, owned by applicants' assignee and incorporated by reference herein. As shown in FIG. 2, the cushion 12 is formed from a single piece of substantially square fabric joined together along seams 30 by stitching 34. The cushion 12 includes four seams 30 joining together four edges 32 of the fabric and terminating at the opening 26, around which attachment hardware is connected. The seams 30 and stitching 34 may extend from either the inner or outer surface of the cushion 12.

The shape of the fabric used to make the cushion 12 (that is, before the edges 32 are secured by the seams 30) is shown in dotted lines in FIG. 2. The substantially square shape of the unfolded cushion 12 avoids the wasting of cushion material during manufacture of the cushion. However, it should be understood that the shape of the cushion fabric need not be square within the scope of the present invention. For example, the unfolded cushion 12 may be substantially triangular, pentagonal, hexagonal, or irregularly-shaped.

Also, the cushion may be constructed from multiple pieces of fabric within the scope of the present invention.

The cushion is preferably constructed of a woven fabric having low air permeability, and having sufficient tensile strength, tear strength, and burst strength to be inflated rapidly to the desired inflation pressure while withstanding impact from a person or other object to be protected. Any of the lightweight fabrics set forth in U.S. patent app. Ser. No. 08/872,471 may be employed within the scope of the invention, as well as heavier fabrics.

The seams 30 are preferably located on the inner surface 22 of the cushion 12 and thereby protrude from the inner surface to form protrusions. This construction allows the cushion to have a smooth outer surface, thereby minimizing the potential for an abrasive injury to a person during inflation. However, the seams may also extend from the outer surface 24, within the scope of the invention. The seams 30 may be formed by sewing the edges 32 together in zig-zag stitches using thread 34 made of nylon. As will be described below, various types of seams 30 or thread 34 made of the materials are acceptable. The seams 30 may be reinforced with tape or adhesive, or by heat sealing. U.S. patent app. Ser. No. 08/872,471 sets forth various methods of joining edges 32 of the cushion which can be employed within the scope of the invention.

Figure 3:
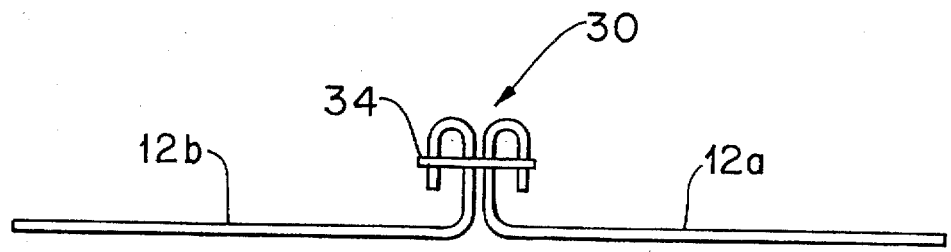
FIG. 3 is a diagrammatic sectional view of a possible construction of a seam of the inflatable cushion shown in FIG. 1 in an uninflated condition.
Figure 4:
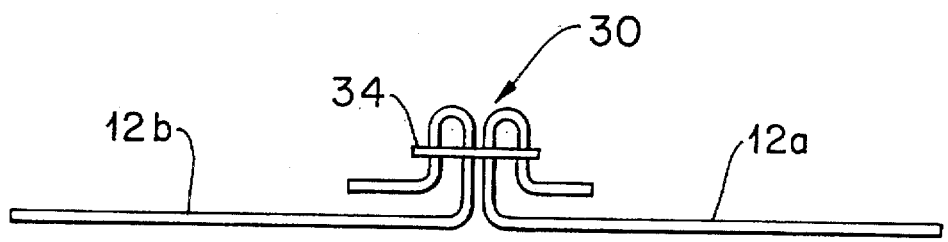
FIG. 4 is a diagrammatic sectional view of the seam shown in FIG. 2 in an inflated condition.

FIGS. 3 and 4 show a typical protrusion extending from the cushion in the form of seam 30, in which two portions 12a, 12b of a cushion 12 are joined by stitching 34. FIG. 3 shows the seam 30 in a relaxed (uninflated) state, while FIG. 4 shows the seam in an inflated state. As can be seen, during inflation the seam 30 expands stretching the portions 12a, 12b taut.

Other protrusions which could extend from the cushion 12 include gathered portions of cushion material, such as folded portions, bunched portions, multiple layered portions, or other nonplanar or discontinuous portions of the cushion. Some protrusions (other than seams) are created when the cushion is assembled or installed into the attachment hardware. Thus, some protrusions are caused by the manufacture of the cushion, and others are caused by the installation of the cushion in the attachment assembly. Preferably, the attachment assemblies of the various embodiments of the present inventions can be used with cushions having all types of protrusions.

Figure 5:
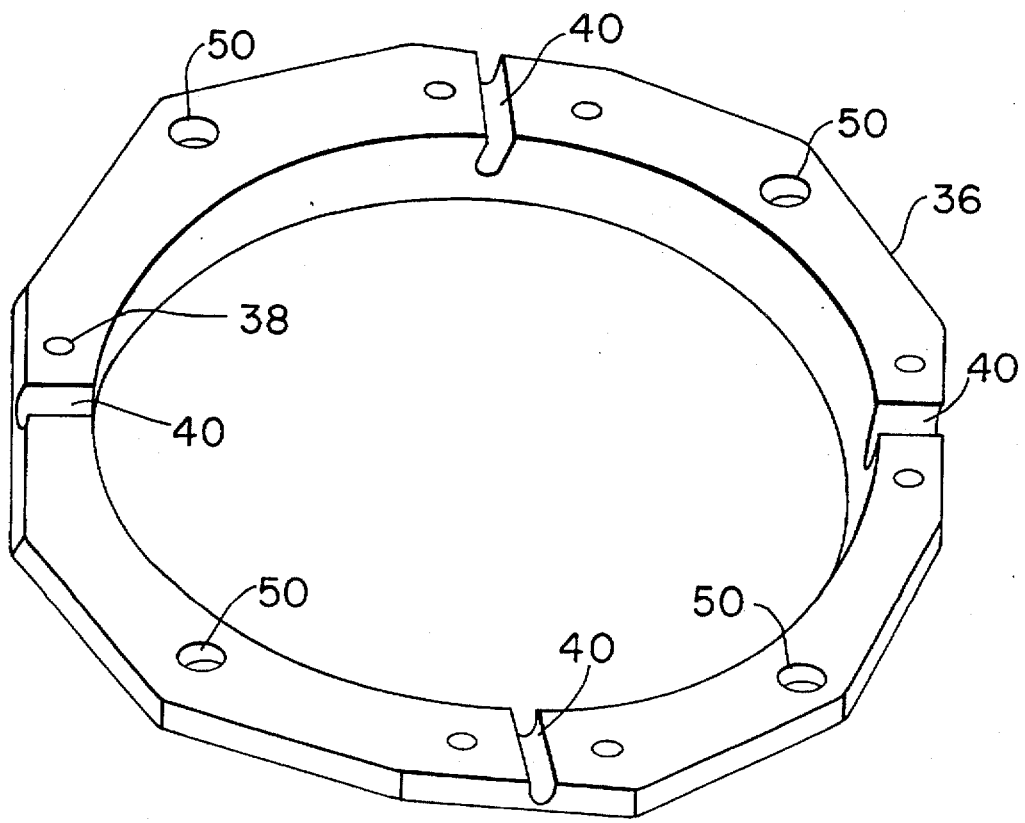
FIG. 5 is a perspective view of an attachment member of the attachment assembly of FIG. 1.

In accordance with the invention, the attachment assembly 14 includes an attachment member for securing the inflatable cushion 12 to the attachment assembly. As shown in FIGS. 1 and 5, the attachment member may be a collar 36 having an opening 38 substantially equal in size to the opening 26 in the cushion 12 for receiving the inflator 18. The collar 36 is preferably a rigid member, and may be an annular ring, as shown. The term "rigid" is used herein to describe the stiff element (collar 36 in FIG. 1) of the attachment hardware that distributes force around the opening in the inflatable cushion. The collar 36 may be made of metal such as 6061 grade aluminum or 2024 grade aluminum for larger applications, and may be formed by stamping, forging, or milling. Alternately, the collar 36 may be made of plastic such as nylon or Torlon®, made by Amoco, and may be formed by injection molding and milling. Making the cushion 12 and collar 36 out of the same material, such as a plastic, improves the recyclability of the device by reducing the number of components that must be disassembled. Also, other parts of the assembly may also be made of plastic to further improve recyclability. If the collar 36 is made of plastic, it may be joined to the cushion 12 by nuts and bolts made of the same material.

The attachment assembly 14 may preferably include a tray 42 for holding the cushion 12 in an uninflated and folded state. That is, before the cushion 12 is inflated, it is folded up compactly and held between the tray 42 and a cover (not shown) detachably secured to the tray. When the inflator 18 inflates the cushion 12, the cover is opened by the force of the gases entering the cushion. The tray 42 has an opening 44 substantially the same size as the openings in the cushion 12 and the collar 36 for receiving the inflator 18. The tray 42 may be formed of plastic or metal.

The attachment assembly 14 may also preferably include a retaining member which cooperates with the attachment member to secure the cushion 12 to the inflator 18. As shown in FIG. 1, the retaining member is a rigid flange 46 extending from the inflator 18. Preferably, the flange 46 is formed of a metal, and it may be made of the same material as the collar 36 if desired. The flange 46 may be secured to the inflator 18 in any known fashion so as to form an integral unit. For example, the flange 46 may be secured to the inflator 18 by bolts, rivets, crimping, molding, welding etc. The flange 46 shown in FIG. 1 has a planar upper surface for contacting the underside of the tray 42.

Figure 6:
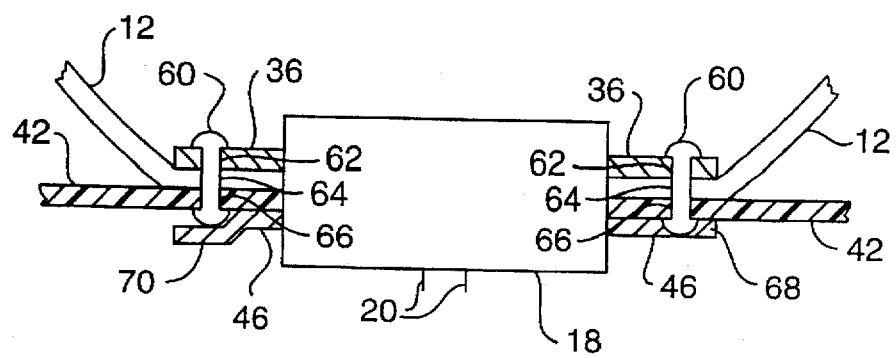
FIG. 6 is a sectional view of the embodiment shown in FIG. 1, taken along a different line than in FIG. 1.

The attachment assembly 14 may also preferably include connection members for securing various elements of the claimed invention together. For example, as shown in FIG. 6, the connection members may include rivets 60 securing together the collar 36, the cushion 12, and the tray 42. The rivets 60 extend through holes (62, 64 and 66, respectively) to thereby join the collar 36, cushion 12, and tray 42 into a single unit, which permits an efficient assembly process, as will be described below.

As shown in the right-hand side of FIG. 6, the flange 46 of the inflator 18 is preferably not secured by the rivets 60. A recessed portion 68 is provided on that part of the flange 46 for avoiding contact between the flange and the head of rivet 60 to thereby allow the flange to snugly engage the tray 42. Alternately, as shown in the left-hand side of FIG. 6, a bent portion 70 may be provided in the flange 46 for avoiding the head of the rivet 60. Another alternative structure (not shown), would be a counterbore in the hole 66 in the tray 42 having a depth sufficient to receive the head of the rivet 60, thereby avoiding the need to provide the recessed and bent portions 68, 70 on the inflator flange 46.

As shown in FIG. 1, the connection members may also include bolts 48 extending through holes (50, 52, 54, and 56 respectively) in the collar 36, the cushion 12, the tray 42, and the flange 46. The bolts 48 may be threaded partially into the collar 36, as shown in FIG. 1, or they may extend entirely through the collar (not shown). The shown arrangement is preferred for ease of assembly, as will be described below. Nuts 58 threaded onto ends of the bolts 48 secure the cushion 12, the tray 42, and the collar 36 to the inflator flange 46 when tightened. Therefore, tightening the nuts 58 provides a unitary assembly including the cushion 12, inflator 18, and tray 42, which assembly can be readily installed onto the desired housing 16. Additional connection members such as bolts, rivets, or some other fastener, (not shown) can be provided through holes 72, 74, in the tray 42 and housing 16, respectively, to secure the unitary assembly to the housing.

It should be understood that the connection members need not comprise the specific bolts 48 and rivets 60 described above. Other types of connectors could be substituted. For example, tabs, clips, or clamps could be used, so long as they are sufficiently strong to secure the various elements together during manufacture, installation, and especially inflation.

Further, if desired, the rivets 60 (or alternate fasteners) may be deleted. In such an arrangement, the bolts 48 and nuts 58 secure together the collar 36, the cushion 12, the tray 42 and the inflator flange 46, as above. However, in this alternative, as soon as the cushion 12 is attached to the tray 42, the inflator 18 is also attached. This attachment sequence may be undesirable for logistical reasons during manufacture, or to avoid damage to the sensitive inflator 18 during manufacture or shipping.

As shown in FIGS. 1 and 5, the collar 36 includes at least one groove 40 for receiving a protrusion, such as the seam 30 or a gather protruding from one of the inner or outer surfaces 22 or 24 of the cushion 12. As shown in FIG. 5, four grooves 40 are formed in the collar 36, each groove for receiving one of the The grooves 40 shown in FIGS. 1 and 5 can be sized substantially larger than the seams 30 (if the grooves are to receive protrusions in the form of seams), for ease of installation. For example, a typical seam for a 45×100 denier fabric is 1/12 inches wide and 3/8 inches high. The dimensions of a "wide-groove" for receiving for such a seam would preferably be 1/8 inches wide by 1/2 inches deep. Thus, preferably the groove 40 is approximately 1/24 inches wider than the seam 30 and 1/8 inches deeper than the seam.

Using such a "wide-groove" structure allows the seams 30 to be readily placed within the grooves 40 during manufacture. For example, there are two manufacturing tolerances associated with seams that can be accounted for by using a wide-groove structure. First, there is a tolerance in the width of a seam, and second there is a tolerance as to the location of a seam on the cushion (i.e., seam-to-seam spacing). The use of wide grooves allows the seams to be readily fitted within the grooves, even if the seam size or location varies from the optimum.

However, it is also possible to size the grooves 40 just larger than the seams 30 to provide a more secure fit of the seam in the groove. The "narrow-groove" structure provides extremely tight gripping of the cushion material, and can be used in applications were such gripping is desired. However, aligning the seams in a narrow groove can be more difficult during manufacture. Thus, narrow grooves may perform slightly better than wide grooves, but wide grooves may provide slightly easier installation. Depending on the manufacturing process used and application envisioned, either type of groove may be employed, both types will perform satisfactorily in most applications.

Alternate groove shapes are also possible. For example, within the scope of the invention, the grooves for receiving the protrusions may have shapes specifically tailored for receiving a certain type of protrusion and for gripping the portion of the protrusion within the groove in an inflated state. If the protrusion is a seam, the portion of the seam inside the groove is oriented so that, when the cushion is inflated and the seams attain their inflated orientation, the discontinuity between the inflated seam portion and the gripped seam portion is substantially eliminated. Such an arrangement avoids stress and shear concentrations present in the transition portion of prior art constructions where the gripped seam portions are not held in an inflated orientation.

Figure 7:
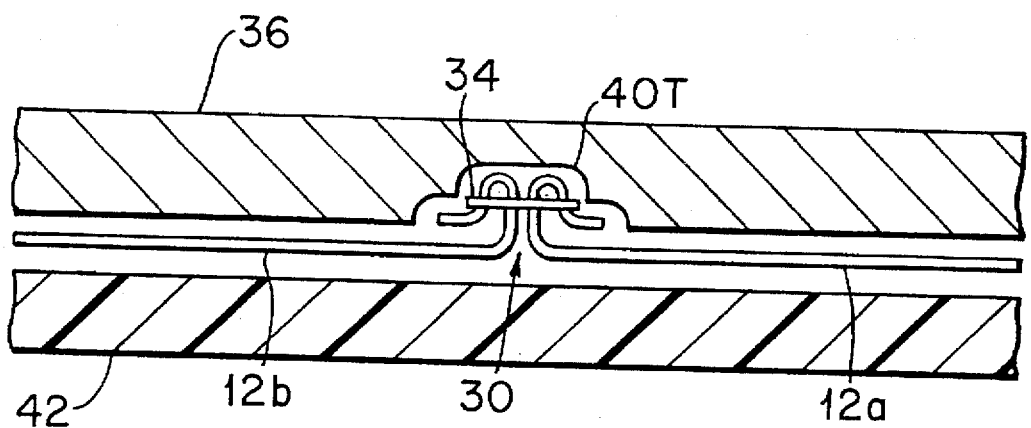
FIG. 7 is a diagrammatic sectional view of the seam shown in FIG. 2 secured by a collar having a T-shaped groove.

One example of such an alternative, "tailored" groove shape is shown in FIG. 7, where the groove 40T formed in the collar 36 is substantially T-shaped for receiving a protrusion in the form of the seam 30. As shown in FIG. 7, the groove 40T is oriented with the T-shape upside-down. Preferably, the groove 40T is sized so as to hold the portion of seam 30 within the groove in the inflated state shown in FIG. 4.

Figure 8:
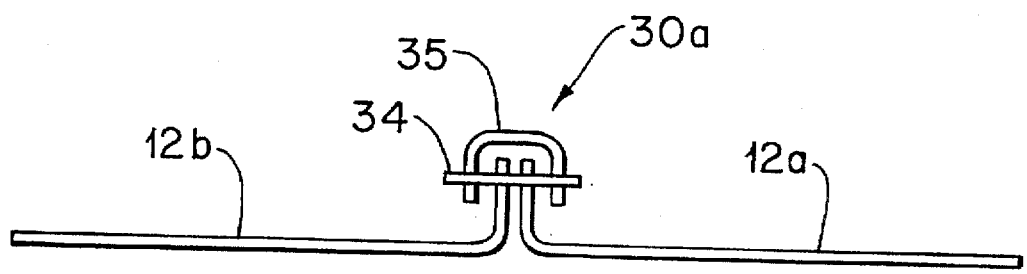
FIG. 8 is a diagrammatic sectional view of another possible construction of a seam of the inflatable cushion shown in FIG. 1.
Figure 9:
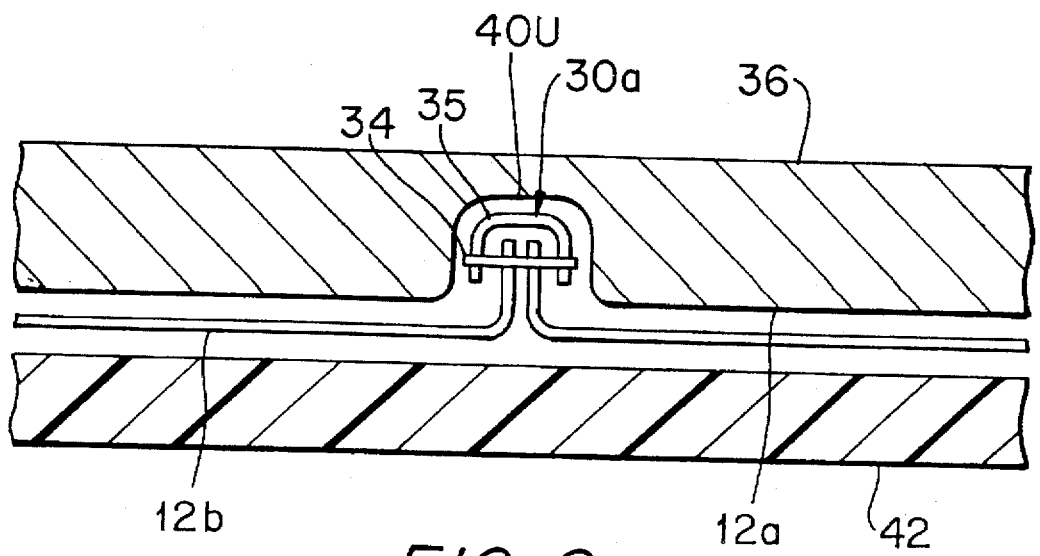
FIG. 9 is a diagrammatic sectional view of the seam shown in FIG. 8 secured by a collar having a U-shaped groove.

An alternate protrusion in the form of seam 30a formed by a "Serge" stitch is shown in FIG. 8. Seam 30a includes stitching 34 and a piece of cloth reinforcement tape 35. Alternately, adhesive tape could be substituted for the cloth tape 35. As shown in FIG. 9, a U-shaped groove 40U (oriented with the U-shape upside-down) is provided in the collar 36 for holding a portion of the seam 30a in its inflated state.

Figure 10:
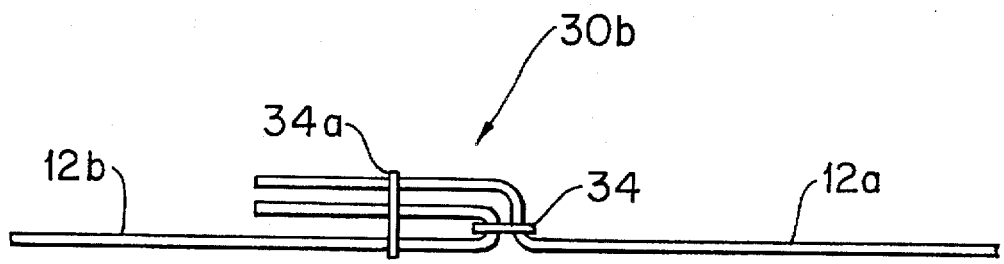
FIG. 10 is a diagrammatic sectional view of another possible construction of a seam of the inflatable cushion shown in FIG. 1.
Figure 11:
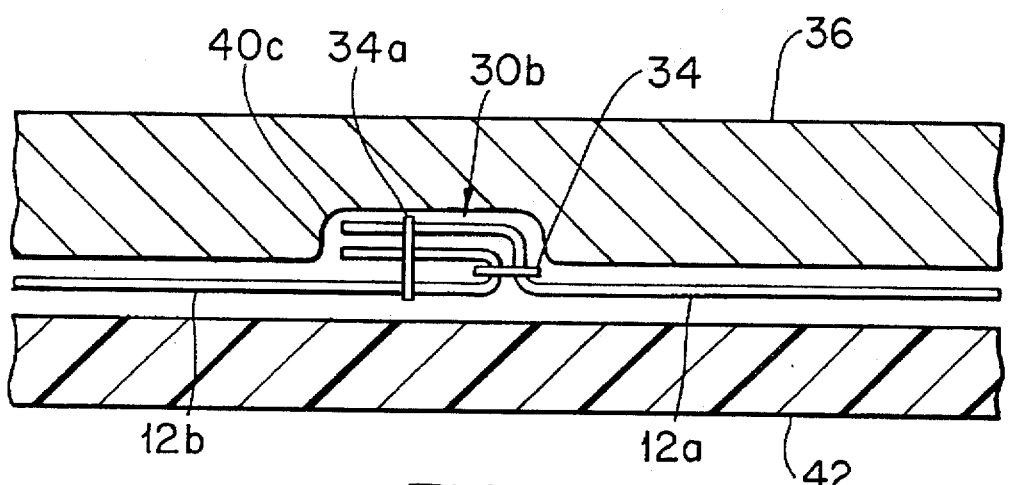
FIG. 11 is a diagrammatic sectional view of the seam shown in FIG. 10 secured by a collar having a channel-shaped groove.

Another alternative protrusion in the form of seam 30b formed by two-pass layover stitching 34, 34a is shown in FIG. 10. A corresponding channel-shaped groove 40C is provided in the collar 36 for holding a portion of this seam 30b in its inflated state, as shown in FIG. 11.

It should be apparent to one of ordinary skill in the art that the dimensions of the tailored grooves in the collar are dependent on the size and shape of the chosen seam or gather present in the fabric, the fabric thickness, and the stitching type. Therefore, the present invention is not limited to the specific protrusion or groove types described herein. Furthermore, even if the "wide grooves" do not hold the gripped portion of a seam in the inflated orientation, they still help reduce seam discontinuity by allowing the portions of the seam within the attachment hardware to attain an inflated orientation during inflation.

Figure 12:
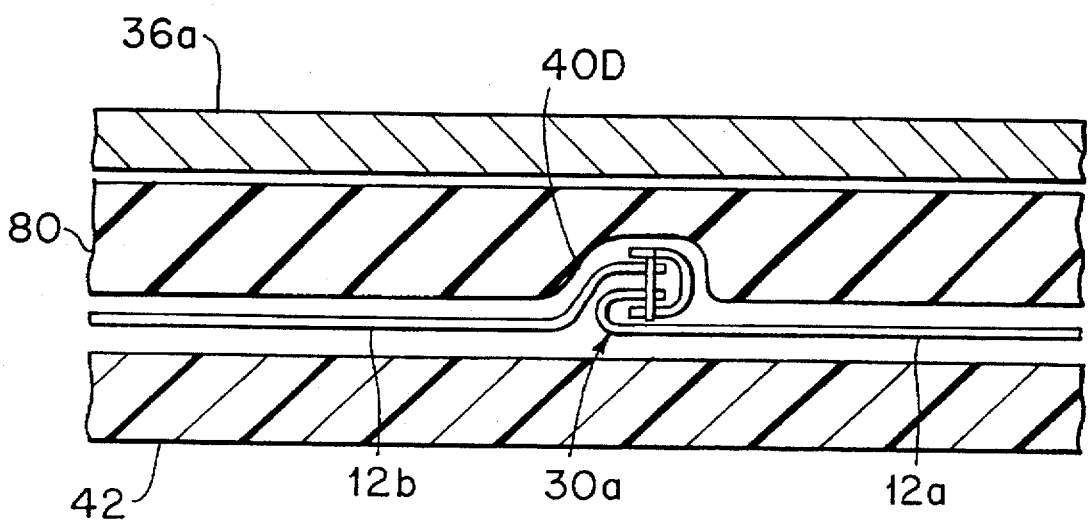
FIG. 12 is a diagrammatic sectional view of the seam shown in FIG. 8 secured by a collar and a resilient member.

FIG. 12 shows an alternate arrangement to that of FIGS. 1–11 in which the attachment member that contacts the cushion 12 is a resilient annular member 80 that extends about the opening 26 of the cushion. The resilient annular member 80 is preferably made of a flexible material such as rubber, cork, plastic, nylon, a moldable material such a Silicone RTV, or a hardenable adhesive. In the embodiment of FIG. 12, a retaining member is also provided for securing the attachment member to the assembly. The retaining member in the device of FIG. 12 is a collar 36a. The protrusion shown is seam 30a, the same as in FIG. 8, and a groove 40D is formed in the resilient annular member 80 by contact with the protrusion after the tightening of the connection members. Thus, at least some of the connection members secure the collar 36a, the resilient annular member 80, and the cushion 12 together into a single unit, thereby forming the groove 40D. As described above, this single unit can be secured to an inflator and housing by additional connection members (not shown). While the embodiments including rigid collars with grooves can be more effective in providing relief of stress concentration for certain cushion designs than the embodiment of FIG. 12, the embodiment of FIG. 12 effectively provides some stress concentration relief.

Figure 13:
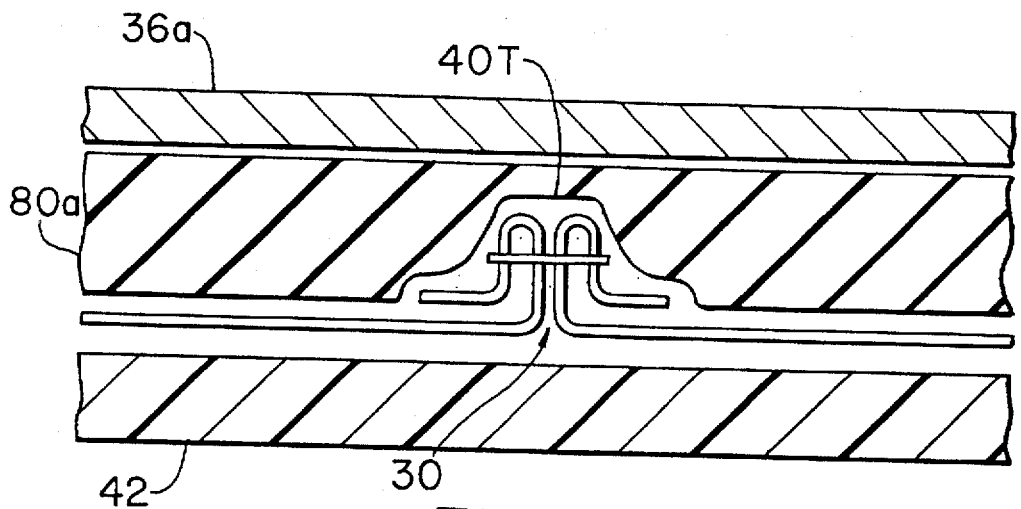
FIG. 13 is a diagrammatic sectional view of the seam shown in FIG. 2 secured by a collar and a resilient member having a T-shaped groove.
Figure 14:
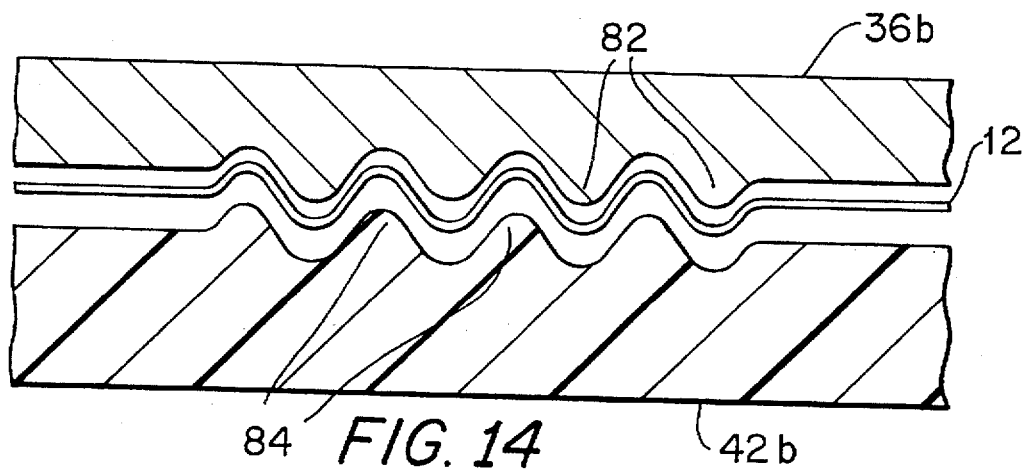
FIG. 14 is a diagrammatic sectional view of a portion of the inflatable cushion shown in FIG. 1 mounted between rippled surfaces of rigid members.

FIG. 13 shows an arrangement combining the teachings and benefits of several of the previous embodiments. Namely, FIG. 13 shows a resilient attachment member 80a having a permanently-formed recessed groove 40T. The groove 40T in FIG. 14 is T-shaped. A collar 36a and connection members (not shown) secure the resilient annular member 80a in place, as described above. The arrangement of FIG. 14 can provide improved stress concentration relief as compared to the arrangement of FIG. 12. It should be understood that the arrangements of FIGS. 12 and 13 may be employed using any of the protrusion, seam, or gather types described herein, or any others, within the scope of the present invention.

FIGS. 14–21 show other alternate arrangements for improving the securing of an inflatable cushion. In these arrangements, the attachment members each have a non-planar contact surface for contacting a portion of one of the inner or outer surfaces of the cushion adjacent the opening.

As shown in FIG. 14, the attachment member is a rigid collar 36b that opposes a tray 42b. A plurality of ridges 82 and 84, respectively, is provided in the surface of the collar 36b and the surface of the tray 42b. The ridges 82, 84 are sized to as to be interleaved with each other when the attachment assembly 14 is assembled, thereby providing increased surface area for contacting the cushion and securing it in place. The ridges 82, 84 can be arranged in parallel or radiating from the center of the collar, and can cover all or part of the surfaces contacting the cushion. Use of the ridges is especially desirable in applications where the cushion fabric is lightweight. Connection members (not shown) secure the collar 36b, cushion 12, and tray 42b together.

Figure 15:
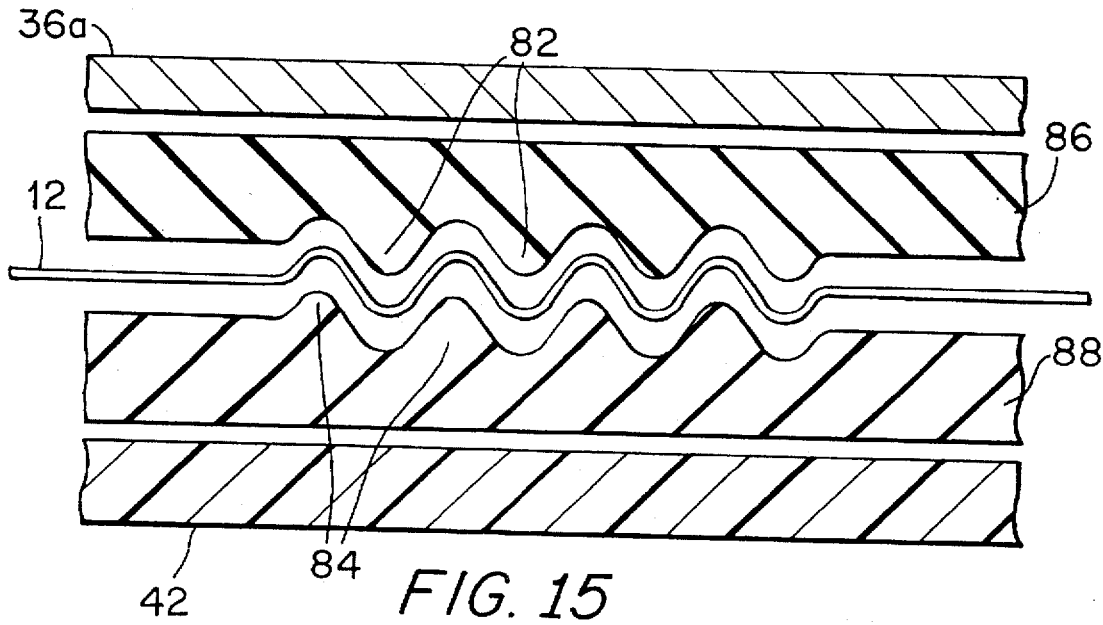
FIG. 15 is a diagrammatic sectional view of a portion of the inflatable cushion shown in FIG. 1 mounted between rippled surfaces of resilient members secured between rigid members.

A variation of the arrangement of FIG. 14 is shown in FIG. 15, in which resilient annular members 86, 88 are provided on either side of the cushion 12. The resilient annular members 86, 88 have interleaved ridges 82 and 84, respectively. A collar 36a contacts one of the resilient annular members 86, and the other member 88 contacts the tray 42. Connection members (not shown) secure the collar 36a, the resilient annular members 86, 88, and the cushion 12 to the tray 42.

It should be kept in mind that the ridges of the embodiments of FIGS. 14 and 15 may be utilized either in conjunction with the grooves described above or alone.

Figure 16:
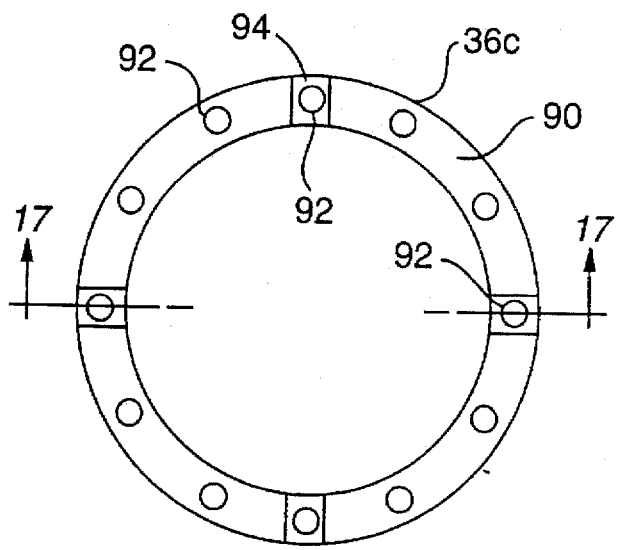
FIG. 16 is a top view of an attachment member according to an alternate embodiment of the present invention.
Figure 17:
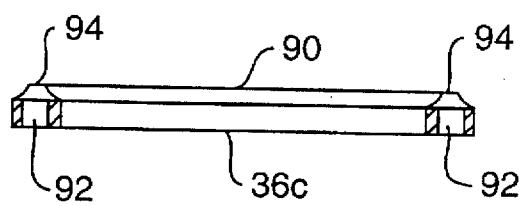
FIG. 17 is a sectional view of the attachment member shown in FIG. 16 taken along line 17—17.
Figure 18:
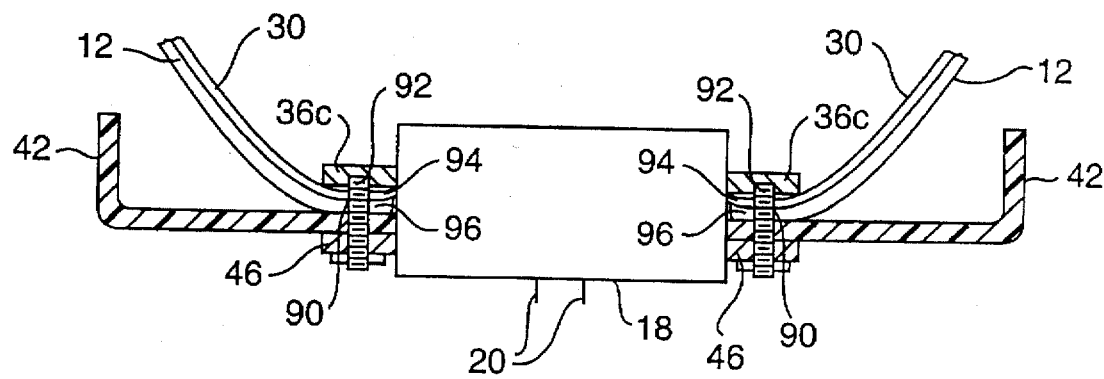
FIG. 18 is a sectional view of an alternate embodiment of the present invention incorporating the attachment member of FIG. 17.

FIGS. 16-18 show one alternate embodiment of the present invention in which a non-planar contact surface is provided on the attachment member for contacting one of the inner or outer surfaces of the cushion. As shown in FIGS. 16 and 17, the attachment member may be a collar 36c including a single convex ridge 90 running around the surface of the collar to contact one of the inner or outer surfaces of the cushion. Holes 92 and grooves 94 are also provided, functioning as do the holes and grooves of the previous embodiments. As shown in FIGS. 16 and 17, some of the holes 92 may be provided within the grooves 94. This arrangement further reduces the stresses on the cushion as it is inflated, and can be used in conjunction with the previous embodiments as well.

If the attachment member includes a non-planar contact surface such as a ridge, an indentation for matingly receiving the ridge should also be provided. For example, FIG. 18 shows an assembly in which an indentation 96 is provided in the tray 42 for matingly engaging the ridge 90 of the collar 36c, with a portion of the cushion 12 therebetween. The device of FIG. 18 is substantially similar to that of FIG. 1, except for the ridge 90 and the indentation 96.

Figure 19:
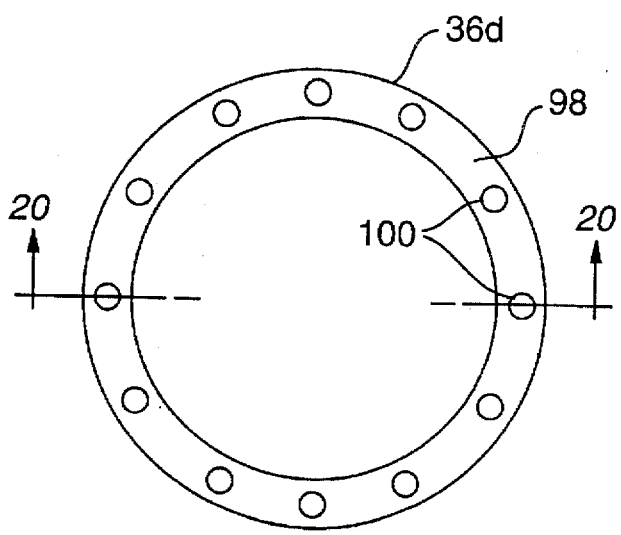
FIG. 19 is a top view of an attachment member according to another alternate embodiment of the present invention.
Figure 20:
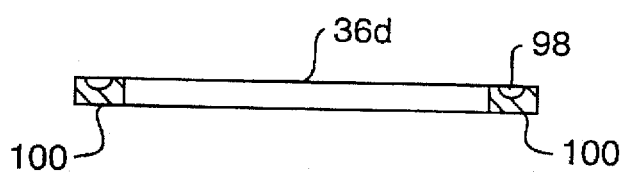
FIG. 20 is a sectional view of the attachment member shown in FIG. 19 taken along line 20—20.
Figure 21:
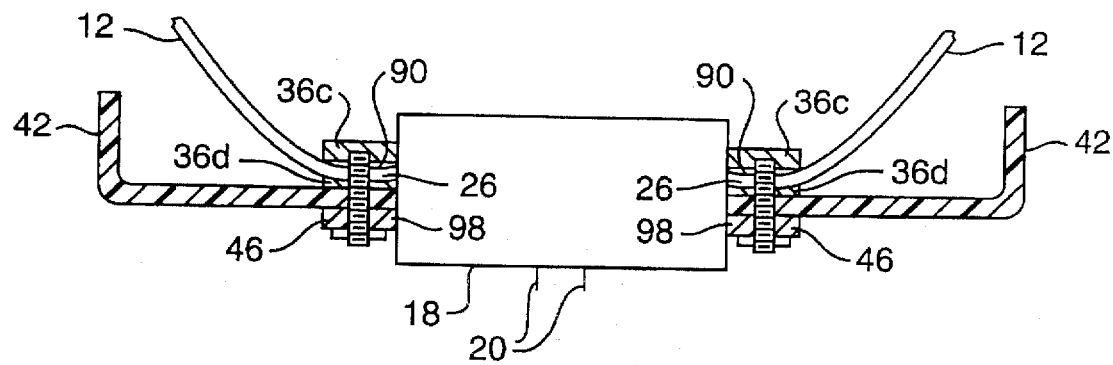
FIG. 21 is a sectional view of an alternate embodiment of the present invention incorporating the attachment members of FIGS. 16 and 19.

A second alternative embodiment including a non-planar contact surface opposing the non-planar attachment member contact surface appears in FIGS. 19-21. In this embodiment, a retaining member, separate from the flange provided on the inflator, contacts the cushion. As shown best in FIGS. 19 and 20, the retaining member is a rigid collar 36d that has a concave indentation 98 for matingly engaging the ridge 90 in the other collar 36c. Collar 36d has holes 100 for receiving connection members, as described above. As shown in FIG. 21, the collars 36c, 36d grip a portion of the cushion 12 around the opening 26. If desired, a groove (not shown) Or a raised portion (not shown) may be provided on the tray 42 for seating the collar 36d.

As an alternative to the above embodiments, an assembly may be provided in which an inflator extends through an opening in a cushion, and an attachment member integral with the inflator extends from the inflator to contact one of the inner or outer surfaces of the cushion adjacent the opening. As broadly embodied in FIG. 22, the attachment member is a flange 110 extending from the inflator 18. The flange 110 differs from the flange 46 in the previous embodiments in that flange 110 is disposed inside of the cushion 12 to take the place of the collar 36. Such an arrangement uses fewer parts than the previously-described embodiments.

Figure 22:
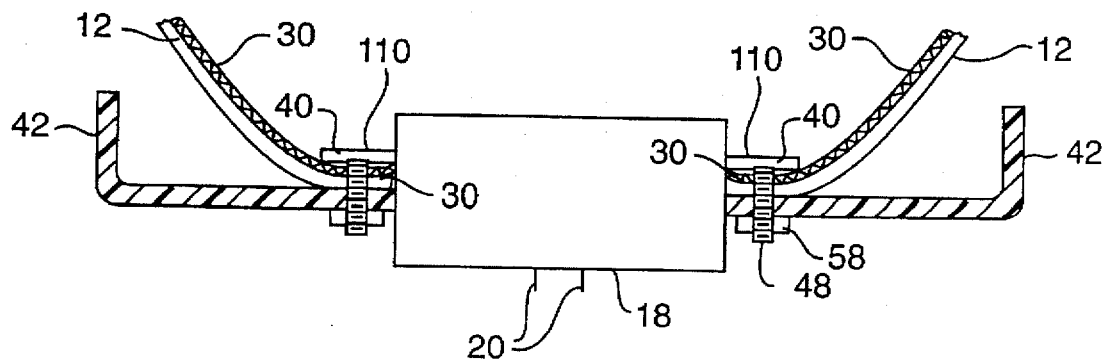
FIG. 22 is a sectional view of yet another alternate embodiment of the present invention.

The embodiment of FIG. 22 also includes at least one groove 40 for receiving a protrusion such as a seam 30 extending from the inner surface of the cushion, and connection members 48 for securing the flange 110 and cushion 12 to a mounting surface, such as a tray 42. Preferably, the groove is disposed in the attachment member, although, if desired, the groove could be disposed in the tray within the scope of the invention. The details of these elements are not discussed or shown in detail here, as they are substantially identical to those disclosed above.

Further, as an option, the embodiment of FIG. 22 may also include the ridges as in FIGS. 14 and 15, a single ridge and indention as in FIG. 18, or a retaining member between the tray and cushion as in FIG. 21. Thus, the individual elements of the various embodiments may be combined in various ways without departing from the scope and spirit of the invention.

Another possible modification to the above embodiments includes providing an attachment member having a rigid portion and a resilient portion. In this embodiment, a rigid retaining member and a resilient attachment member are combined into a single integral unit. Thus, the rigid collar 36a and the resilient annular member 80a may be secured together, for example, by an adhesive or an epoxy. If the annular member 80a is made thick, it will have high resilience. If it is made thin, it will provide less resilience but high frictional gripping of the cushion. Alternatively, the resilient portion can be a resilient coating, such as plastic or rubber, applied to the rigid attachment member to form the integral unit. It is also possible to substitute a textured collar surface, made for example by knurling, for the resilient portion to provide improved frictional gripping. These alternatives provide improved performance along with simplified assembly, and any of these alternatives may be used with the various embodiments described above within the scope of the invention. For example, the resilient coating may be employed on a convex or concave surface of a collar.

The design of the various embodiments disclosed herein simplifies the assembly and installation of the inflatable cushion. For example, in the device of FIG. 1, the cushion 12 is sewn together and the collar 36 is slipped through the opening 26 in the cushion. The bolts 48 extending from the collar 36 are then slipped through the holes 52, 54 in the cushion 12 and tray 42, respectively. The rivets 60 are then inserted into other holes 62, 64, and 66 in the cushion 12, tray 42, and flange 46, respectively, to join these elements into one unit. Any protrusion such as seams or gathers extending from the cushion 12 should be aligned with grooves 40, if present. The cover (not shown) may be mounted on the tray 42 at this point, providing an assembly that may be shipped for ready installation with other elements.

When ready for installation, the inflator 18 is placed through the opening 26 in the cushion 12, with the ends of the bolts 48 fitting into the holes in the inflator flange 46. The nuts 58 are then placed on the bolts 48 and tightened, securing the inflator 18 to the underside of the tray 42. The electrical connectors 20 are connected to the wires that signal the inflator 18 to inflate. The tray 42 is then secured to the housing 16, completing installation of the cushion assembly. Alternately, if desired, the assembly may be shipped for remote assembly after the step of securing the inflator 18.

As mentioned above, the rivets 60 need not be used to install the cushion 12. If not, then the collar 36 is secured to the cushion 12 and tray 42 when the nuts 58 are tightened on the bolts 48, thereby also securing the inflator 18 to the other elements.

If a resilient annular member 80, or members 86, 88, or collar 36d are to be installed, they are secured to the assembly by the rivets or bolts.

Also, it should be apparent to one skilled in the art that the stress distribution benefits of the present invention may be practiced whether the protrusions, seams, or gathers of the inflatable cushion are disposed on the inner surface 22 or the outer surface 24 of the cushion. For example, grooves for receiving the protrusions may be disposed on the element opposing the one of the inner or outer surfaces from which the seams extend. This opposing element may be the attachment member, the tray, or the flange on the inflator. Similarly, the resilient attachment member, if used, should be disposed so that it opposes the surface from which the protrusion extend. Therefore, although applicants have set forth numerous alternative embodiments of the present invention, the present invention is not limited only to those embodiments, but extends to alternatives employing the scope and spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An inflatable cushion assembly for use with an inflator, the assembly comprising:
    an inflatable cushion having an inner surface, an outer surface, and at least one seam or gather extending from one of the inner or outer surfaces, the inflatable cushion defining an opening between the inner surface and the outer surface for receiving the inflator; and
    an attachment member contacting one of the inner or outer surfaces adjacent the opening and including a groove extending substantially in the radial direction for receiving the seam or gather, the attachment member securing the inflator within the opening.

2. The assembly of claim 1, wherein the cushion includes a plurality of seams or gathers, and the attachment member includes a plurality of grooves, each groove for receiving one of the seams or gathers.

3. The assembly of claim 1, wherein the groove is T-shaped.

4. The assembly of claim 1, wherein the groove is U-shaped.

5. The assembly of claim 1, wherein the groove is channel-shaped.

6. The assembly of claim 1, wherein the attachment member is rigid and extends about the opening.

7. The assembly of claim 6, wherein the attachment member is made of metal.

8. The assembly of claim 6, wherein the attachment member is made of plastic.

9. The assembly of claim 1, further including a rigid retaining member, the attachment member being resilient and being disposed between the retaining member and a portion of the inflatable cushion, the groove being permanently formed in the attachment member.

10. The assembly of claim 1, further including a rigid retaining member, the attachment member being resilient and being disposed between the retaining member and a portion of the inflatable cushion, the groove being formed in the attachment member via contact with the seam or gather.

11. The assembly of claim 1, further including a rigid retaining member, a portion of the inflatable cushion being disposed between the attachment member and the retaining member, the attachment member being rigid.

12. The assembly of claim 1, further including connection members for securing the attachment member to the inflatable cushion.

13. The assembly of claim 1, further including a tray, a portion of the inflatable cushion being disposed between the attachment member and the tray, the attachment member being rigid.

14. The assembly of claim 1, further including a tray, a portion of the inflatable cushion being disposed between the attachment member and the tray, the attachment member being resilient.

15. The assembly of claim 13, wherein the attachment member includes a convex surface contacting the one of the inner or outer surfaces of the inflatable cushion, and the tray includes a concave surface contacting the other of the inner or outer surfaces of the inflatable cushion, the convex and concave surfaces cooperating to grip the cushion therebetween.

16. The assembly of claim 13, including connection members for securing together the attachment member, the inflatable cushion, and the tray.

17. The assembly of claim 13, further including an inflator secured to the tray for inflating the inflatable cushion via the opening.

18. The assembly of claim 17, wherein the inflator includes a flange, and further including connection members for securing together the attachment member, the inflatable cushion, the tray, and the flange.

19. The assembly of claim 18, wherein certain of the connection members secure together the attachment member, the inflatable cushion, and the tray, and others of the connection members secure together the attachment member, the inflatable cushion, the tray, and the flange.

20. The assembly of claim 11, wherein the attachment member includes a convex surface contacting the one of the inner or outer surfaces of the inflatable cushion, and the retaining member includes a concave surface contacting the other of the inner or outer surfaces of the inflatable cushion, the convex and concave surfaces cooperating to grip a portion of the inflatable cushion therebetween.

21. The assembly of claim 11, wherein the attachment member includes a nonplanar surface contacting the one of the inner or outer surfaces of the inflatable cushion, and the retaining member includes a nonplanar surface contacting the other of the inner or outer surfaces of the inflatable cushion, the nonplanar surfaces matingly engaging each other to grip a portion of the inflatable cushion therebetween.

22. The assembly of claim 1, wherein the attachment member includes a rigid portion and a resilient portion, the resilient portion contacting one of the inner or outer surfaces of the inflatable cushion.

23. An inflatable cushion assembly comprising:
    a tray;
    an inflatable cushion secured to the tray and having an inner surface, an outer surface, and at least one seam or gather extending from one of the inner or outer surfaces, the inflatable cushion defining an opening between the inner surface and the outer surface; and
    an attachment assembly contacting the inflatable cushion for securing the inflatable cushion to the tray, and including means for receiving the seam or gather in a substantially radial direction.

24. The assembly of claim 23, wherein the attachment assembly includes an attachment member, and the receiving means includes a groove formed in the attachment member.

25. The assembly of claim 23, further including connection members for securing together the attachment assembly, the inflatable cushion, and the tray.

26. An assembly for mounting an inflatable cushion to a mounting surface, the inflatable cushion having an inner surface, an outer surface, and at least one seam or gather extending from one of the inner or outer surfaces, the inflatable cushion defining an opening between the inner surface and the outer surface, the assembly comprising:

an inflator extending through the opening for inflating the inflatable cushion;

an attachment member integral with and extending from the inflator and contacting the one of the inner or outer surfaces adjacent the opening, the attachment member including a groove extending substantially in the radial direction for receiving the seam or gather; and connection members for securing the attachment member and the inflatable cushion to the mounting surface.

27. The assembly of claim 26, wherein the attachment member is rigid, the assembly further including a rigid retaining member, a portion of the inflatable cushion being disposed between the attachment member and the retaining member.

28. The assembly of claim 27, wherein the attachment member includes a nonplanar surface contacting the one of the inner or outer surfaces of the inflatable cushion, and the retaining member includes a nonplanar surface contacting the other of the inner or outer surfaces of the inflatable cushion, the nonplanar surfaces cooperating to grip a portion of the inflatable cushion therebetween.

* * * * *

UNITED STATES PATENT AND TRADEMARK OFFICE
CERTIFICATE OF CORRECTION

PATENT NO. : 5,687,986
DATED : November 11, 1997
INVENTOR(S) : Andy W. Getsy, et al.

It is certified that error appears in the above-identified patent and that said Letters Patent is hereby corrected as shown below:

On the title page, item [73] Assignee, should read --OxyTech System, Inc., Chardon, Ohio --.

Signed and Sealed this

Tenth Day of November 1998

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,687,986
DATED : November 18, 1997
INVENTOR(S) : Nelsen et al.

It is certified that error appears in the above-identified patent and that said Letters Patent is hereby corrected as shown below:

On the title page, item[73]:

Assignee,  Precision Fabrics Group, Inc.
Greensboro, N.C.

and

Sandia Corporation
Albuquerque, N.M.

This certificate supersedes Certificate of Correction issued November 10, 1998.

Signed and Sealed this

Fifteenth Day of June, 1999

*Attest:*

Q. TODD DICKINSON

*Attesting Officer*   Acting Commissioner of Patents and Trademarks